TONE CONTROL SYSTEMS FOR ELECTRIC GUITARS AND THE LIKE

Filed Dec. 15, 1965

INVENTORS
DONALD W. ELBRECHT
& ROBERT C. SCHERER
BY William H. Breunig, Agent
Hurvitz & Rose
ATTORNEYS

TONE CONTROL SYSTEMS FOR ELECTRIC GUITARS AND THE LIKE

Filed Dec. 15, 1965

INVENTORS
DONALD W. ELBRECHT
& ROBERT C. SCHERER
BY William H. Breunig, Agent
Hurvitz & Rose
ATTORNEYS INVENTORS
DONALD W. ELBRECHT &
ROBERT C. SCHERER
BY William H. Breunig, Agent
Hurvitz & Rose
ATTORNEYS INVENTORS
DONALD W. ELBRECHT
& ROBERT C. SCHERER
BY William H. Breunig, Agent
Huntz & Rose
ATTORNEYS INVENTORS
DONALD W. ELBRECHT
& ROBERT C. SCHERER
BY William H. Breunig, Agent
Hurvitz & Rose
ATTORNEYS

United States Patent Office 3,454,702
Patented July 8, 1969

3,454,702

TONE CONTROL SYSTEMS FOR ELECTRIC GUITARS AND THE LIKE

Donald W. Elbrecht, Milford, and Robert C. Scherer, Cincinnati, Ohio, assignors to D. H. Baldwin Company, Cincinnati, Ohio, a corporation of Ohio Filed Dec. 15, 1965, Ser. No. 514,051
Int. Cl. G10h 3/00
U.S. Cl. 84—1.14 3 Claims

ABSTRACT OF THE DISCLOSURE

A dual channel tone control system for an electric guitar employing two transducers, one being electromagnetic and the other being a crystal pick-up. Each of the pick-ups drives a different tone control circuit, one of these being switch operated tone color filters and the other being a continuously variable treble and base tone control circuit. The outputs of the two tone control circuits are connected in parallel.

The present invention relates generally to electronic musical instruments, and more particularly to tone-control and amplifier systems for electronic stringed instruments, wherein transducers coupled to the strings are used as tone-signal sources, the systems being of a dual-channel type, one channel at least having means for modifying the tone signals in a variety of ways in pre-established degrees by means of a limited number of simple on-off controls.

In a co-pending application in the names of one of the present inventors, Donald W. Elbrecht, and Thomas W. Cunningham and assigned to the same assignee as the present application, a single-channel system is disclosed in which tone-control filters, operated by simple on-off actuators, produce pre-established tone colors, which, in some cases, approach the tonal characteristics of different types of guitars, such as, for example, the "rock-and-roll" guitar, classic guitar, base guitar and the type of guitar used for Western music.

The present invention integrates the teachings of Elbrecht and Cunningham into systems already known in the art wherein a dual-channel amplifier will have continuously variable, conventional tone-controls and volume control in one channel and will have continuously-variable tone-controls, tremolo, reverberation and volume control in another channel. Such prior art, dual-channel amplifier systems have the disadvantages that (1) different types of guitars must be made available to the versatile artist for a wide range of music and (2) different variations of tone are limited in scope and not readily reproducible.

Therefore, it is a primary object of this invention to provide a guitar amplifier system having wider and more versatile ranges of tone color than are available with standard amplifiers known in the art.

A further object is to provide in a single channel of a guitar amplifier system a choice of either pre-selected tone colors or continuously-variable tone colors, or both at will.

A still further object is to teach a dual-channel amplifier system for electronic musical instruments, in which system one channel provides volume control, base tone control and treble tone control, while in a second channel provision is made for volume control, base tone control, treble tone control, reverberation, tremolo-speed control, tremolo-intensity control and pre-set tone-control ranges, all being selective at will.

The above and still further objects, features and advantages of the present invention will become apparent upon consideration of the following detailed description of one specific embodiment thereof especially when taken inconjunction with the accompanying drawings, wherein.

Figure 7:
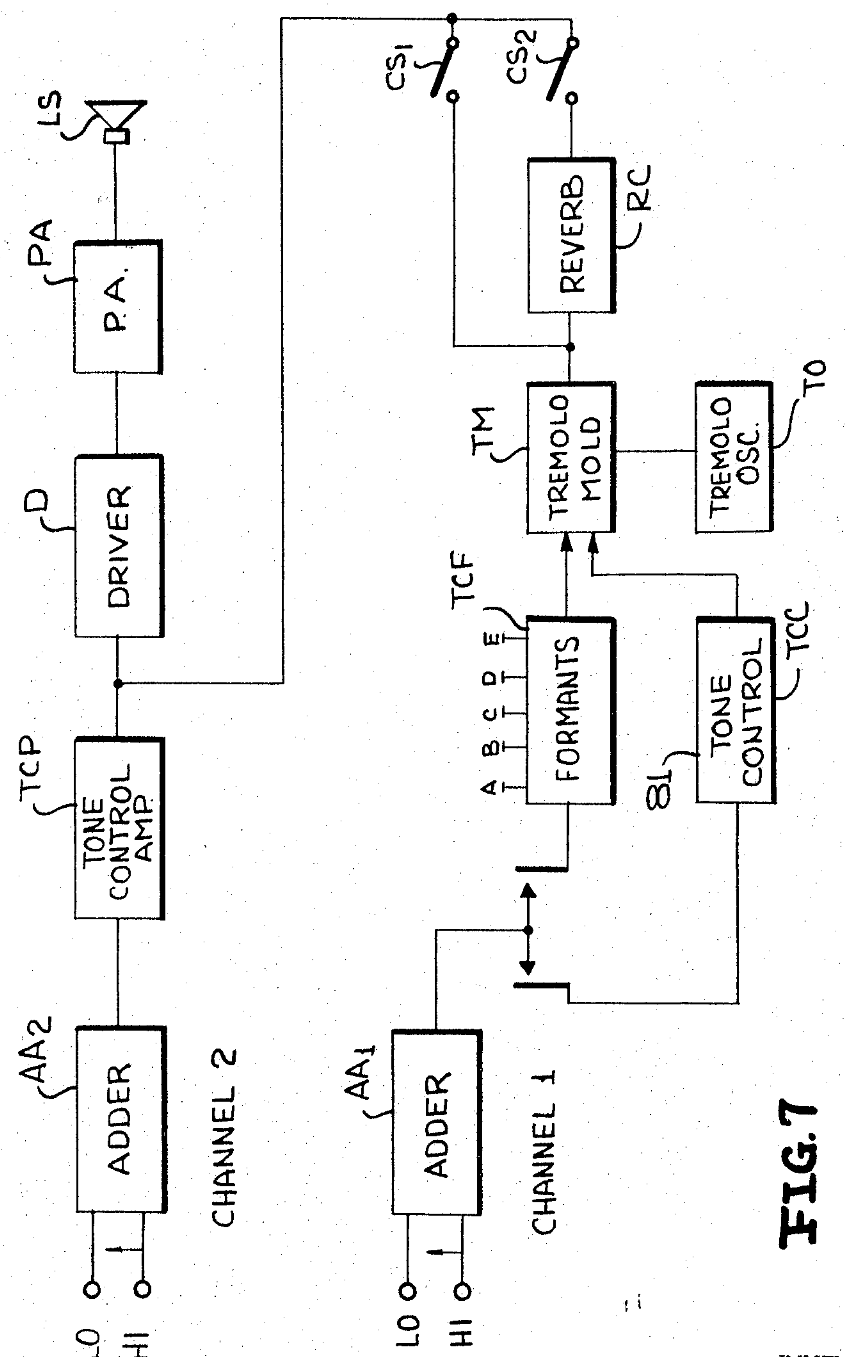

FIGURES 3, 4, 5, 6 taken together constitute a schematic circuit diagram of the electronic circuitry of the invention; and FIGURE 7 is a block diagram of the circuitry of FIGURES 3–6, inclusive.

Figures 1, 3:
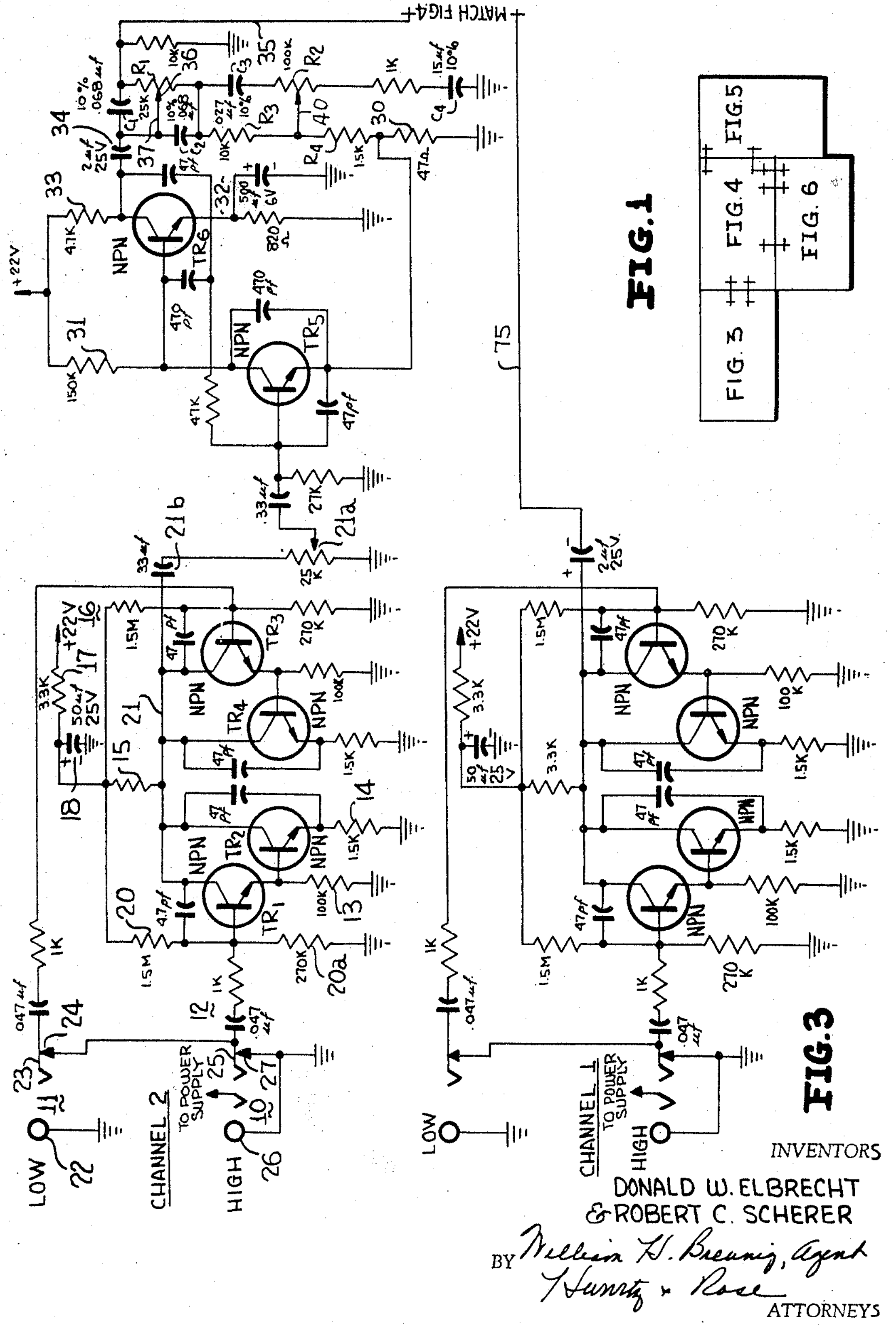
FIGURE 1 is a diagram showing the correct assembly of the sheets of drawings to provide a complete circuit diagram.
Figures 2, 4:
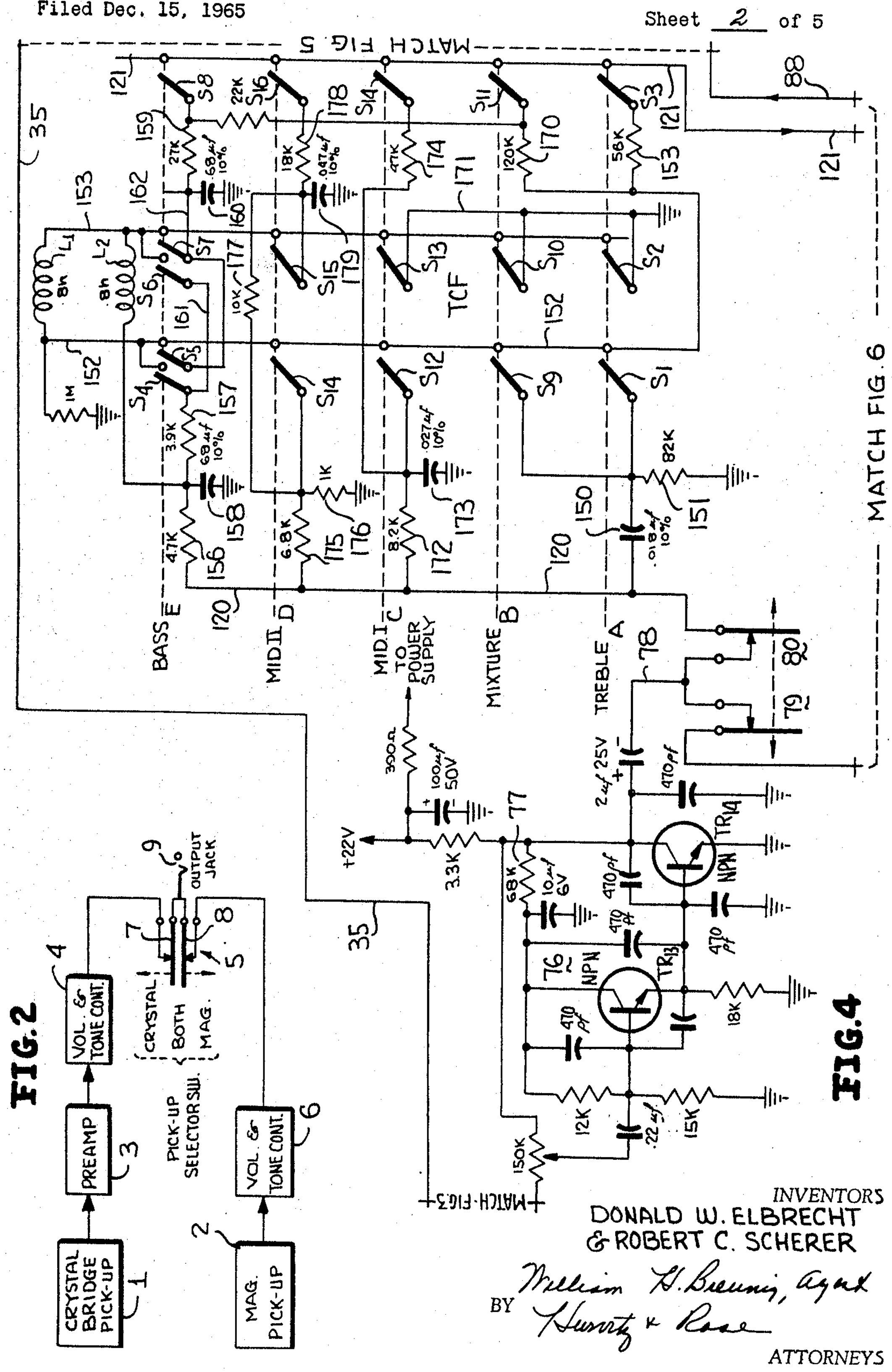
FIGURE 2 is a block diagram of circuitry and transduction equipment which may be employed as part of a guitar for providing signals to the electronic circuitry of the invention.
Figure 5:
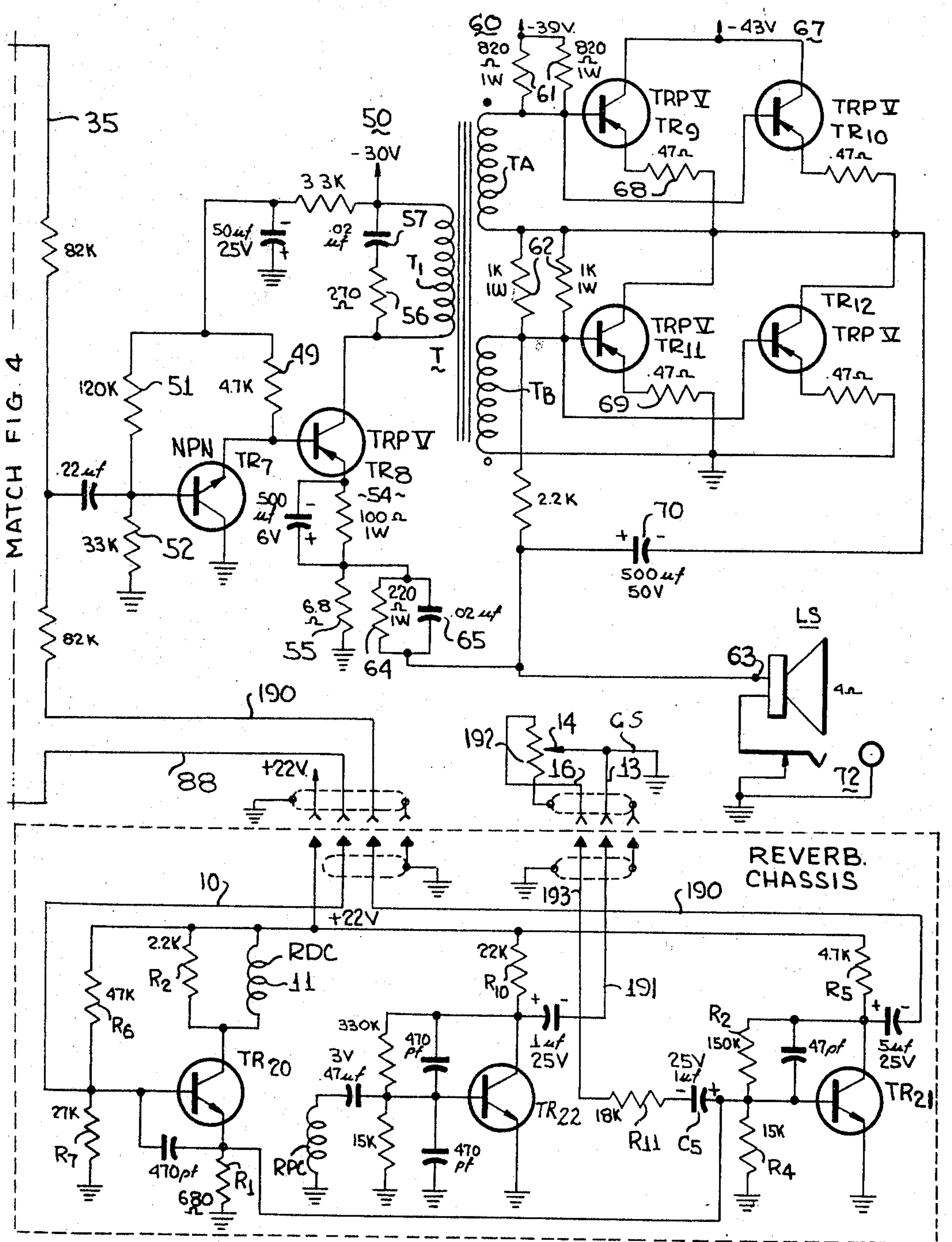
Figure 6:
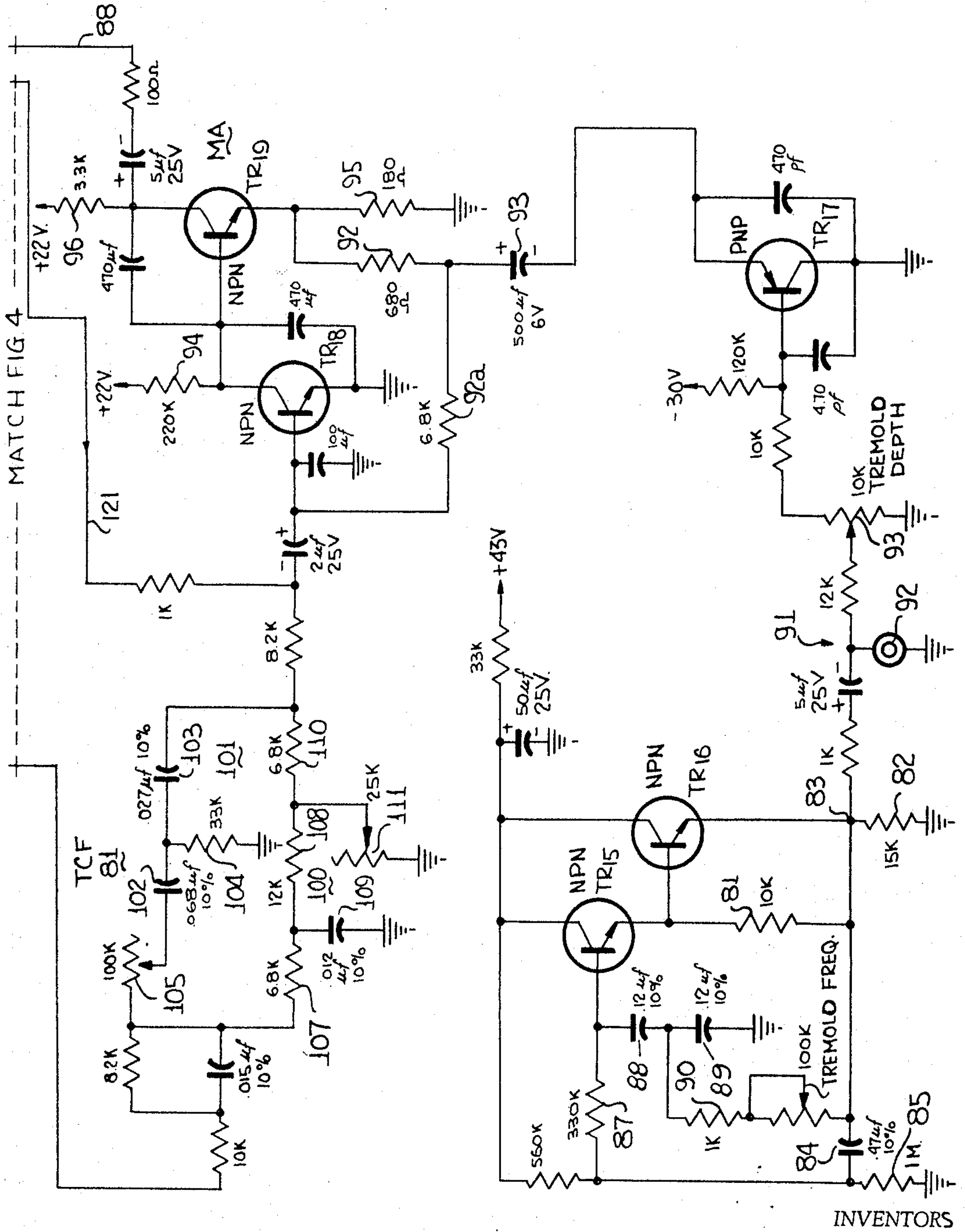

Referring now to FIGURE 2, a string motion transducer 1, called a crystal bridge pick-up, is provided as part of an electric guitar. Such transducers are conventional and involve piezoelectric crystals, usually mechanically coupled to the strings of the guitar by being located under or constituting the bridge of the guitar. Additionally, an electric guitar may be provided with an electromagnetic pick-up 2 which responds to the movement of metallic string without contact therewith. Both facilities are not required, but may be available. A reason exists for having both in that each type of transducer can produce a different character of tonal output.

The output of crystal bridge pick-up 1 is amplified in amplifier 3, since it is normally of low amplitude, and applied via a conventional volume-tone control circuit 4 to stationary contact of a switch 5. The output of magnetic pick-up 2 is applied to another stationary contact of switch 5 via a volume and tone control circuit 6. The switch 5 includes two movable arms 7 and 8, cooperating with the stationary contacts, respectively, and these have a common output jack 9. Accordingly, there is available at jack 9, the tonal output of either transducer, or of both, according to the positions of movable contacts 7, 8. As illustrated, both transducers provide such output to jack 9.

ADDER (FIGURE 3)

In channel 2, a high input jack 10 and a low input jack 11 are provided. The high input jack 10 proceeds via a series RC coupling network 12 to the base of an NPN transistor $TR_1$, having an emitter load 13. The emitter of $TR_1$ is directly connected to the base of NPN transistor $TR_2$, which in turn has an emitter load 14. $TR_1$ and $TR_2$ have a common collector load 15, which is in series with a voltage source 16 via a voltage dropping resistance 17, the junction of resistances 15 and 17 being by-passed to ground for alternating currents by capacitor 18. The base of $TR_1$ is biased by a voltage divider comprising series resistances 20, 20*a*. A common output lead 21 for the collectors $TR_1$ and $TR_2$ is provided, which is in series via capacitor 21*b* with a potentiometer 21*a*, acting as a volume control. $TR_1$ and $TR_2$ look, to resistance 15, like a constant current source, so that a replica of the input signal appears across resistance 15, except for a phase reversal.

The low input jack 11 utilizes a circuit similar to that of the high input jack 10, utilizing NPN transistors $TR_3$ and $TR_4$ and identical circuit values associated with these as are associated with $TR_1$ and $TR_2$, and the collector load resistance 15 is common to all four transistors.

The jack 11 includes a grounded element 22 and a movable arm 23 normally contacting point 24. The latter is connected to movable arm 25 of jack 10, which includes a grounded element 26 and a contact point 27 which is grounded. When a male element is inserted in either jack the movable arm, as 23 or 25, is raised, and becomes the hot element of the jack. Operation of jack 11 alone then implies disconnection of contacts 24 and 27, so that no signal is applied to $TR_1$, $TR_2$. On the other hand, operation of jack 10 alone implies that signal is applied in parallel to $TR_1$ and $TR_3$. Collector load 15 then carries double signal current, and its voltage as seen on lead 21 is doubled. At the same time, if both jacks are operated, say in connecting two diverse inputs simultaneously, both inputs will respond at lead 21, but the signal level will be twice that for the single low jack 11, and may be the same as that for the high jack 10 alone.

PRE-AMPLIFIER

The section following volume control 21*a* is a pre-amplifier including tone control circuitry.

Transistor $TR_5$ is an NPN transistor having an unby-passed resistance 30 connected between its emitter and ground. A resistance 31 provides a collector load for $TR_5$ and the collector is connected to the base of transistor $TR_6$. The latter is provided with an emitter bias circuit 32 and a collector load 33. The bias voltage developed by bias circuit 32 is connected back to the base of $TR_5$ and serves to bias the latter. A coupling capacitor 34 then couples the collector of $TR_6$ to tone control circuitry, capable of separately controlling bass and treble.

The tone control circuitry includes a small capacitor $C_1$ in series between capacitor 34 and output lead 35. A capacitor $C_2$ of the same size, is connected from capacitor 34 in series with resistance 30. Resistance $R_1$ is connected across $C_1$ and $C_2$ in series, and a variable slider 36 is connected from the junction of $C_1$ and $C_2$ to the resistance $R_1$. $C_2$ then supplies feedback signal to resistance 30 while $C_1$ provides signal to the load. As slider 36 moves up, $C_1$ is progressively by-passed, which provides bass boost in output lead 35. Since a zero impedance path 37 is provided from $C_2$ to $R_1$ at their ground-adjacent points, moving slider 36 up decreases bass feedback. Thereby, moving the slider up boosts bass by decreasing feed through impedance and decreasing negative feedback; when slider 36 moves down, feedback capacitor $C_2$ is shunted out of circuit, progressively, while $C_1$ is cut in. Thereby, series attenuation to lead 35 increases while feedback signal increases.

Capacitor $C_3$, resistance $R_2$, resistance $R_2'$, and capacitor $C_4$ are connected in series from resistance $R_1$ to ground. Slider 40 slides on $R_2$ and is connected back to the feedback path, at the junction of $R_3$, $R_4$, which are connected between $C_2$ and resistance 30. As slider 40 moves up treble is cut, because degeneration is progressively added via $C_3$, while by-pass of treble frequencies to ground is decreased. As the slider moves down, treble is boosted because degeneration is decreased via $C_3$, and treble by-pass to ground increased via $C_4$.

DRIVER AND POWER AMPLIFIER (FIGURE 5)

Signal appearing on lead 35 is coupled to the base of an NPN transistor $TR_7$ having a grounded collector and an emitter load 49 connected back to a negative voltage supply 50. A voltage divider composed of resistances 51, 52 connected back to the same supply 50 furnishes bias for $TR_7$, and the emitter of $TR_7$ is directly connected to the base of a further PNP transistor $TR_8$. The emitter of the latter is connected to ground through a bias circuit 54 and a feedback resistance 55, a primary winding $T_1$ of a transformer T being connected in the collector circuit as a load. Across winding $T_1$ is connected a small resistance 56 and a small capacitor 57, in series, to provide a high-frequency by-pass to prevent supersonic oscillations.

Two secondary windings TA and TB are provided in transformer T. These are oppositely poled to provide a push-pull output for power amplifier transistors.

The transistors employed in the main power amplifier are denoted $TR_9$ and $TR_{10}$, in parallel, and $TR_{11}$ and $TR_{12}$, in parallel. Bias voltage for the transistors $TR_9$ to $TR_{12}$ is provided from a negative bias voltage source 60. The latter is connected through parallel resistances 61 to the base of $TR_9$, through winding TA, then via resistances 62 in parallel to the base of $TR_{11}$ and thence to terminal 63 of loudspeaker LS, providing a path to ground through the speaker. Point 63 is connected back to resistance 55 through a resistance 64 which is by-passed for high audio frequencies by capacitor 65. Accordingly, the signal appearing across loudspeaker LS is fed back degeneratively to the emitter of $TR_8$.

The collector PNP transistor $TR_9$ is connected directly to a negative voltage supply 67, and its emitter is connected via a small fuse 68 directly to the collector of $TR_{11}$, the emitter of which is connected via a small fuse 69 directly to the ground. At the same time, the junction of the emitter of $TR_9$ and the collector of $TR_{11}$ are coupled via a large capacitor 70 to terminal 63. Accordingly, as $TR_9$ and $TR_{11}$ are driven out of phase from transformer T their relative impedances vary inversely. They act as a variable voltage divider for point 63 and thereby serve to drive the loudspeaker LS. Coupling from point 63 to the emitter resistance 55 of $TR_8$ provides negative feedback to the driver stage.

Transistors $TR_{10}$ and $TR_{12}$ parallel $TR_9$ and $TR_{11}$, respectively, at all electrodes to enhance power handling capacity and their presence does not modify operation otherwise.

A jack 72 is provided between loudspeaker LS and ground to enable insertion of additional speakers in series with LS.

The system channel above described is "channel 2." A further "channel 1" is provided, which includes an adder amplifier and input jacks, and amplifier circuitry precisely the same as that above desecribed under the heading adder. It is therefore not described in detail. The output of the latter appears on lead 75, which is connected to the input of a pre-amplifier 76 which lacks tone control features, and which has a flat response. The signal on lead 75 is supplied to the base of NPN transistor $TR_{13}$, operated as an emitter follower. The emitter of $TR_{13}$ is connected to the base of NPN transistor $TR_{14}$, which is emitter-grounded and collector loaded by resistance 77. The collector of $TR_{14}$ is connected back as shown to the base of $TR_{13}$ to provide considerable negative feedback, and output is provided at lead 78.

The lead 78 proceeds to two normally-closed ganged switches 79 and 80. In the normal position switches 79 and 80 provide "channel 1" signal in parallel to a set of tone color filters TCF and to a tone control circuit 81. When switch 80 is opened, the tone color filters TCF are disconnected, but the tone control circuit 81 remains in circuit. In the alternative, when switch 79 is opened, switch 80 remains closed and only the tone color filters TCF remain in circuit. The outputs of tone color filters TCF and of tone control circuit 81 are applied in parallel to a modulator amplifier MA. The signal therefrom is passed along to the power amplifier driver via a reverberator which is described in detail hereinafter. At the power amplifier driver, the signals from channels 1 and 2 are combined.

TREMOLO OSCILLATOR

The tremolo oscillator of the present system, which supplies modulation signal to modulator amplifier MA, includes an NPN transistor $TR_{15}$, having its collector directly connected to a positive supply source 80, and having a resistive emitter load 81, 82. The emitter of $TR_{15}$ is connected directly to the base of an NPN transistor $TR_{16}$. The latter includes a collector directly connected to voltage supply 80, an emitter connected to the junction 83 of resistances 81, 82. Junction 83 is coupled via a capacitor 84 across a 1 M. resistance 85. The latter is connected to the base of $TR_{15}$ via resistance 87, so that the coupling is via a T-bridge having capacitor 84 as its shunt arm.

From the base of $TR_{15}$ to ground is connected, in series, a pair of capacitors 88, 89, from the junction of which a variable resistance 90 proceeds back to junction 83, providing a T bridge having resistance 90 as its shunt arm.

Feedback from the emitter of $TR_{16}$ to the base of $TR_{15}$ is positive, but different phase shifts exist in the two feedback paths from terminal 83, one path subsisting through variable resistance 90 and the junction of capacitors 88, 89, and the other through capacitor 84 and the junction of resistances 85, 87 and together serving to establish oscillatory conditions. Since frequency of an RC oscillator is determined by loop phase shift, the frequency of the oscillator can be adjusted by varying the value of resistance 90. The frequencies selected are in the low sub-audio range, say 4–14 c.p.s. The tremolo oscillator is essentially of a conventional parallel-T type, and therefore its theory of operation is not expanded.

The output of the oscillator appears at terminal 83. That point is coupled via a path 91 to the base of a PNP transistor $TR_{17}$. The path 91 can be shunted to ground by a foot operated switch 92, and includes an interposed volume control 93, which sets tremolo depth.

The modulator amplifier MA includes a first amplifier NPN transistor $TR_{18}$, which is emitter grounded and collector loaded by resistance 94. The collector of $TR_{18}$ is directly connected to the base of an NPN transistor $TR_{19}$, which includes a small feed-back emitter resistance 95, and a larger collector resistance 96. The collector of $TR_{19}$ supplies signal to lead 88. The emitter of $TR_{19}$ is coupled by a resistance 92 and a large capacitor 93 to the emitter of PNP transistor $TR_{17}$, and via resistances 92 and **92*a*** to the base of transistor $TR_{18}$, for feed-back.

$TR_{17}$ includes a grounded collector and a base which is biased negative. It acts as a signal-controlled variable resistance in the emitter circuit of $TR_{19}$, in parallel to feed-back resistance 95 serving to vary the total feed-back of modulator amplifier MA.

As the resistance of $TR_{17}$ varies, the feedback to the base of $TR_{18}$ varies. Thereby, the gain of amplifier modulator MA varies and the signal on lead 88 is tremolo modulated. The use of a PNP transistor $TR_{17}$ permits a small feedback resistance 95, since the emitter resistance is small and highly sensitive to base voltage.

The tone control circuit 81 includes a base section 100 and a treble section 101. The treble section 101 consists of a pass filter of conventional configuration, i.e., two series capacitors 102, 103, and a shunt resistance 104 to ground from their junction. Control is effected by a variable resistance 105 in series with the filter, so that the highs may be augmented or decreased. Filter 100 is a low pass filter of conventional configuration, i.e., two series resistances 107 and 108 and a shunt capacitor 109, capable of by-passing highs. A further resistance 110 is connected in series with resistance 108, and the junction of resistances 108, 110 is variable shunted to ground via variable resistance 111.

The combination of filters 100, 101 can provide continuously-variable treble and bass tone control, indpendently.

TONE COLOR FILTERS (FIGURE 4)

Tone color filters TCF constitute a set of components providing resistance, capacitance, and inductance, and which can be selected in various combinations to form any one of five filters in response to five switch assemblies which are mutually exclusive, so that closure of one set opens all others. Such switches, and the mechanical features thereof, are well known and therefore are not described in detail, or illustrated.

Lead 120, connected to switch 80, is a common input lead for the filters, and lead 121 a common output lead.

On closure of ganged switches $S_1$, $S_2$, $S_3$, series capacitor 150 and shunt resistance 151 are connected via lead 152 in series with inductance $L_1$, and thence to ground via line 153 and $S_2$. At the same time a circuit is completed from resistance 151 via $S_1$ to resistance 153 and via $S_3$ to output lead 121. The lead 121 is thus connected to the junction of capacitor 150 and inductance $L_1$, and the circuit values are selected to provide a treble filter, having shunt inductance and resistance and series capacity.

When switches $S_4$, $S_5$, $S_6$, $S_7$ and $S_8$ are simultaneously closed, a low pass filter section composed of series resistances 156, 157 and shunt capacitor 158 is provided connected to input lead 120, and a further low pass section composed of series resistance 159 and shunt capacitor 160 is connected via $S_8$ to output lead 121. Connecting these sections in series are lead 161, $S_6$, $S_7$, and lead 162.

Inductance $L_2$ is directly connected from the junction of resistance 156 and 157 to resistance 159. The total configuration passes bass and attenuates treble.

Switches $S_9$, $S_{10}$, $S_{11}$ provide a circuit which is similar to that provided by $S_1$, $S_2$, $S_3$ except for the inclusion of a resistance 170 in place of 153 and the inclusion of the low-pass filter section composed of series resistance 156, shunt capacitor 158, inductance $L_2$, shunt capacitor 160 and resistance 159. Accordingly, the "mixture" switches permit passage of both treble and bass, reducing the mid-tones.

Switches $S_{12}$, $S_{13}$, $S_{14}$ insert a low-pass section composed of series resistance 172 and shunt capacitor 173, and resistance 174 in series, between leads 120 and 121. In addition, inductance $L_1$ is connected in shunt, via $S_{12}$, lead 152, $L_1$, lead 153, $S_3$ and lead 171. The combination provides a band pass at a mid-frequency.

For closure of switches $S_{14}$, $S_{15}$, $S_{16}$, there is inserted series resistance 175, and shunt resistance 176, resistance 177 and low-pass section composed of series resistance 178 and shunt capacitor 179. In addition, $L_2$ is shunted around resistance 177 via $S_{14}$ and $S_{15}$. The resultant filter provides a low-pass circuit which accentuates mid-range frequencies.

The output lead 121 deriving from tone color filters TCF proceeds to the base of $TR_{18}$, in parallel with the output of tone control circuitry 81, to provide "dual" control so that the tone color selected can be shaded by the additive tones provied by the tone control circuitry 81.

REVERBERATOR

The signal present on lead 88, deriving from modulator amplifier MA proceeds to the base of an NPN transistor $TR_{20}$, which is provided with an emitter load $R_1$ and a collector load consisting of a reverberator drive coil RDC for the input transducer of a reverberator coil or spring. The latter is shunter by a resistance $R_2$, so selected that excessive voltage is never developed across RDC due to its increasing impedance as a function of frequency. RDC can respond to about 2000 c.p.s., but carries the entire audio spectrum and is mechanically operative at all times during operation of the system.

The signal developed across $R_1$ is applied to the base of NPN transistor $TR_{21}$, which which is collector loaded by $R_5$, and supplies signal to the input lead 190 of $TR_7$.

The pick-up coil of the reverberator spring transducer, RPC, is connected to the base of NPN transistor $TR_{22}$, loaded by resistance $R_{10}$ at its collector. Reverberated output proceeds via lead 191, a potentiometer 192 which sets depth, and a lead 193 to the base of $TR_{21}$, so that both reverberated and unreverberated signal is presented on lead 190. To remove reverberation the potentiometer 192 is shorted to ground via a foot switch CS.

Accordingly, the reverberator is always operative, unless CS is closed, but unreverberated signal is always supplied to $TR_7$ so long as signal is supplied to "channel" 1.

SUMMARY

Referring to FIGURE 7, two adder amplifiers $AA_1$ and $AA_2$ are provided, constituting channel 1 and channel 2 of the system. Each adder amplifier is provided with two inputs, each for low input, and each of which utilizes a different one-half of the adder amplifier, if two inputs are provided. If an input is provided to only input LO, one-half the adder amplifier is employed, while if only one input is provided for jack HI, the adders are both utilized in parallel to provide double amplitude output.

Adder $AA_2$ proceeds, in cascade, to a tone control pre-amplifier TCP, a driver D, a power amplifier PA, and a loudspeaker LS.

Adder $AA_1$ proceeds selectively via tone control filters 81 and/or formant filters TCF, to a tremolo modulator TM modulated from tremolo oscillator TO. Tremolo modulator TM drives reverberator circuit RC, and control switch CS indicates that unreverberated signal is provided to driver D, with or without reverberated signal.

A wide capability is thus provided. A total of four guitar inputs can be accepted, via the two adder amplifiers $AA_1$ and $AA_2$. In the alternative two guitar inputs can be accepted, at high level or low level jacks in each case. One guitar tone may be provided at high level and two additional guitars each at low level. These capabilities do not involve manipulation of gain controls.

Channel 2 involves a wide range level and tone control having capability of controlling base and treble tone independently, and the output of the control drives a driver and power amplifier which is common to both channels.

Channel 1 includes facility for passing tone signals either via pre-set tone color filter TCF, or via a tone control circuit TCC, or both. The outputs of the filters are applied to a tremolo modulator. The output of the latter can, selectively, be reverberated (in the reverberator), or not reverberated, and the thus processed signal is then amplified and electro-acoustically transduced.

The tone control amplifier TCP is essentially a high fidelity pre-amplifier, so that channel 2 can be used not only for guitars, but also for microphone input, tape recorder input, and the like. The tone control circuitry TCC and TCF are designed for forming guitar tones of a wide variety of characters. The tone control circuits TCF provides five distinct tones, available by operation of push button switches, labeled A, B, C, D, E for purposes of identification. Each filter is selected by operating one push button, the push buttons being interrelated mechanically so that operation of any one disables all others. Switches A (see FIGURE 4) provide treble tone only, switches E provide bass tones only, switches B provide a mixture of bass and treble, while switches C and D provide emphasis of different mid-range frequencies. For many purposes this set of filters suffices in reproducing guitar music, and the arrangement has the advantage of being reproducible and obviating knob-controlled adjustments which are difficult to reset.

The tone control filters TCC provide a bass section and a treble section essentially, either of which can be largely disabled, as by inserting full series resistance 105 (FIGURE 6) or full shunting at the slider of potentiometer 111.

The filter TCC may therefore add bass or treble or both to the output of the system, over and above that provided by filters TCF, and therefore modify the characteristics provided by each individual filter of TCF. This modification can subsist in the addition of treble, or bass, by selectively cutting in or out the filter sections 100 and 101, individually or together. The filters TCC have a null or near-null attenuation point in the mid-band, which is not substantially affected by the adjustments of the filters.

We claim:

1. In a guitar system,
a source of guitar tones,
said source including string vibration transducers,
a tone color filter in cascade with said source of guitar tones,
said tone color filter including a plurality of electrical circuit elements,
a plurality of multiple switch assemblies,
separate actuators each operative simultaneously to close the switches of one multiple switch assembly,
means connecting said circuit elements to said multiple switch assemblies in such connections that operation of each actuator synthesizes a different tone color filter from said electrical circuit elements, and
a continuously variable bass and treble tone control circuit in parallel with said tone color circuits, whereby each of the tone colors provided by said tone color circuits may be continuously varied in either bass or treble or both.

2. In an electric guitar system,
a plurality of signal input channels,
each of said input channels including an input jack for connection to an electric guitar,
a separate tone control circuit in each of said channels,
the tone control circuit in one of said channels including parallel paths,
plural tone formant filter circuits in one of said paths,
selective switches connected to said plural tone forming filter circuits for selecting any one of said plural formant filter circuits at will,
a continuously variable tone control circuit connected in the other of said paths,
means connecting the outputs of said paths in parallel, and
means for selectively connecting the inputs of said paths in parallel and individually in said one of said channels.

3. The combination according to claim 2 wherein said continuously variable tone control circuit is a bridged-T network,
said bridged-T network including two parallel bridged-T circuits for bass and treble control respectively, and
means for individually adjusting the responses of said bridged-T circuits.

References Cited

UNITED STATES PATENTS

| | | | |
|---|---|---|---|
| 3,215,767 | 11/1965 | Martin. | |
| 3,217,079 | 11/1965 | Murrell | 84—1.16 |
| 3,340,343 | 9/1967 | Woll | 84—1.16 X |

HERMAN KARL SAALBACK, *Primary Examiner.*

PAUL L. GENSLER, *Assistant Examiner.*

U.S. Cl. X.R.

84—1.12, 1.15, 1.16, 1.21